Feb. 10, 1948.　　　M. ALBANESE　　　2,435,567
METHOD AND APPARATUS FOR MOLDING WIRE CORE TEMPLES
Filed Oct. 18, 1944　　　2 Sheets-Sheet 1
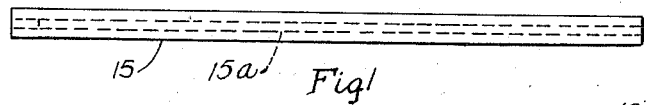
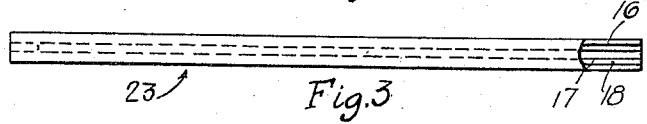
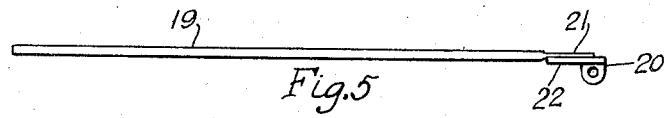
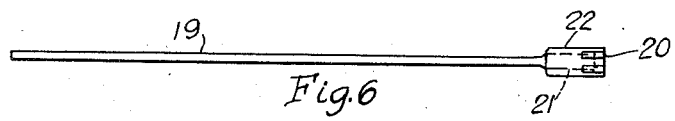
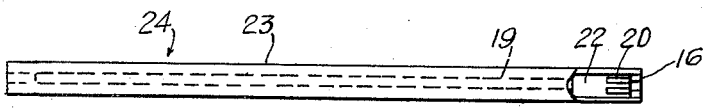
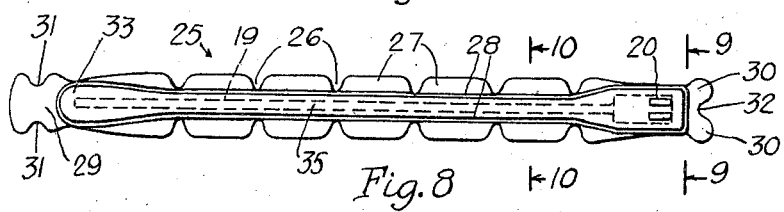
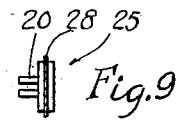
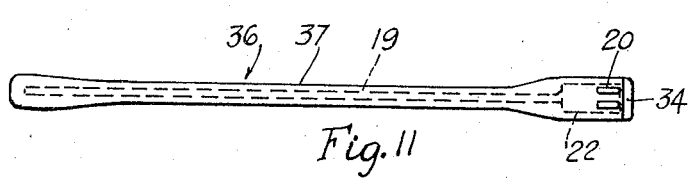
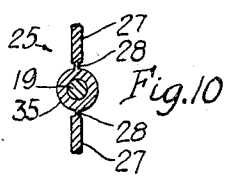
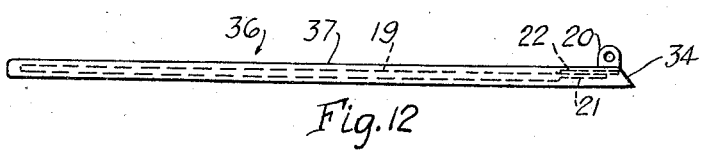
INVENTOR.
Michael Albanese
BY
Louis Shumacher, Atty Feb. 10, 1948.　　　M. ALBANESE　　　2,435,567
METHOD AND APPARATUS FOR MOLDING WIRE CORE TEMPLES
Filed Oct. 18, 1944　　　2 Sheets-Sheet 2
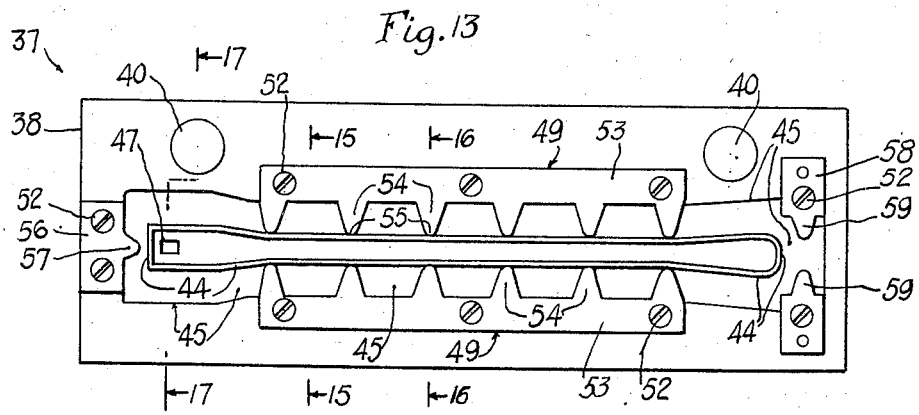
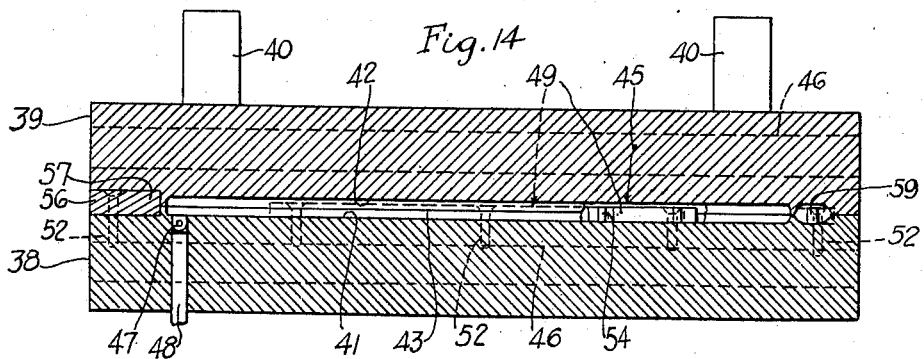
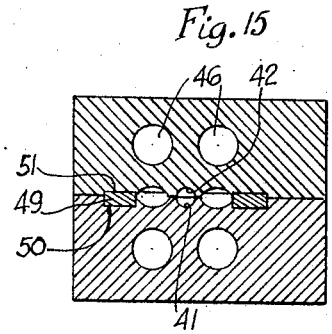 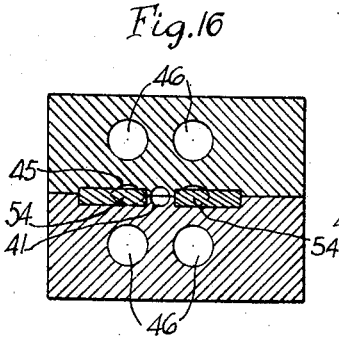 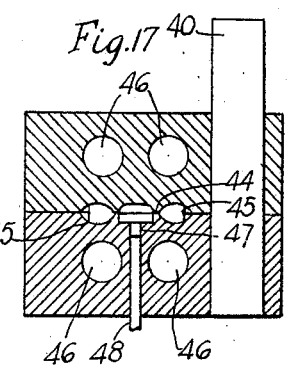
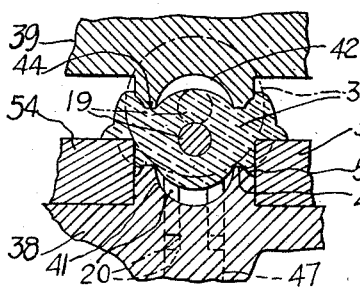
INVENTOR.
Michael Albanese
BY
James Shumacher
Atty Patented Feb. 10, 1948

2,435,567

UNITED STATES PATENT OFFICE 2,435,567

METHOD AND APPARATUS FOR MOLDING WIRE CORE TEMPLES

Michael Albanese, Rutherford, N. J., assignor to Columbia Protektosite Company, Inc., Carlstadt, N. J., a corporation of New Jersey Application October 18, 1944, Serial No. 559,219

9 Claims. (Cl. 18—36)

This invention relates to improvements in the art of molding spectacle temples of plastic strip material.

The utility of the invention is best exemplified in the molding of wire core temples of Celluloid or similar materials which are not adapted for injection molding.

Heretofore the accepted practice for making such wire core temples has been to place a wire between two strips of the said material, and then to subject the strips to the action of a solvent for uniting them together in such a manner as to produce a temple. The cementing together of the plastic strips resulted in a slow operation, but the greatest difficulty was in trying to keep the wire from slipping around between the strips and from deviating from the required central position of the wire particularly if the strips were subjected to a molding pressure which produced various stresses in the plastic tending to shift the wire. Often the cemented strips were merely subjected to a cutting operation to produce the required contour and curves for the temple.

It is therefore an object of the invention to provide an improvement in the art referred to wherein the difficulties above mentioned are overcome, with the wire core being accurately guided into the plastic, in an easy manner to avoid any possible deviation of the wire core while being so guided, and with the plastic mass acting during molding to avoid lateral stresses on the wire core tending to deform or to shift the same from central position in the temple.

Another object of the invention is to furnish an improvement in the art wherein plastic strip means having a preformed bore is utilized to guide the wire core into position, and preferably such strip means being in the form of a tube so that its external curvature will also assist in centering both the tube and the wire core with respect to the mold cavity.

Another object of the invention is the provision of an improvement in the art whereby a temple of varying configuration or cross section can be accurately molded about a wire core.

Another object of the invention is to furnish an improvement in the art whereby a wire core and hinge ear unit can be mounted in the manner set forth and in accurately positioned relation to the plastic portion of the temple.

Another object of the invention is to provide an improvement in the art such that the "flash" or excess plastic squeezed out of the mold at its "land" or parting line is controlled so as to assist in maintaining the tube and wire core centered while the mold is approaching closed position to force parts of the tube into the mold cavity.

Another object of the invention is to furnish an improvement in the art whereby heat is so applied to the plastic as to maintain a relatively firm body of plastic immediately about the wire core to resist molding stresses tending to deform the wire core, while the external portion of the plastic is adapted to readily flow under the molding pressure.

A further object is to provide an improved process and apparatus for accomplishing the foregoing objects.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a side view of a molded, circularly continuous Celluloid tube or blank.

Fig. 2 is an end view thereof.

Fig. 3 is a plan view of the tube formed with a lateral hinge receiving cut out at an end of the tube.

Fig. 4 is an end view.

Fig. 5 is a side view of the interconnected wire core and hinge unit.

Fig. 6 is a plan view thereof.

Fig. 7 is a plan view of the wire core and hinge unit assembled with the tube of Fig. 3.

Fig. 8 is a plan view of the assembly of Fig. 7 after being molded.

Fig. 9 is a sectional view on line 9—9 of Fig. 8.

Fig. 10 is a section taken on line 10—10 of Fig. 8.

Fig. 11 is a plan view of the finished temple.

Fig. 12 is an edge view thereof.

Fig. 13 is a top plan view of the bottom section of the mold.

Fig. 14 is a longitudinal, vertical sectional view of the mold taken through the center of the mold cavity, with a part removed.

Figs. 15, 16 and 17 are vertical sectional views taken through the closed mold at the points respectively indicated by lines 15—15, 16—16 and by the broken line 17—17 of Fig. 13.

Fig. 18 is a fragmentary enlarged view showing the action of the mold on a tubular blank containing a wire core, before the molding has been completed, the initial tubular blank and its core and hinge ear being shown in dot-dash lines.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Generally described, the invention provides for the molding of a tubular element or blank capable of receiving and retaining a wire core in centered position in the blank. Preferably the latter is circularly continuous to afford an equalized reaction for subsequent uniform molding for a wire core temple. Also the blank is preferably externally circular for accurate positioning relative to the mold cavity, which the tubular blank enters upon being subjected to mold pressure. If the wire core is provided with an initially connected hinge ear the tubular blank is formed with a lateral cut out at an end to receive the hinge ear. Into the tubular blank the wire core and hinge ear are inserted, and with the protruding part of the hinge ear serving as a gage, the blank is subjected to heat and pressure for flash molding. As the mold closes, excess plastic or Celluloid material of the blank is squeezed out at the land or parting line of the mold. The tubular blank is accurately positioned in centered relation to the mold cavity and is so maintained while being forced into the smaller overflow chamber, with excess material flowing outward whereby a uniform temple without deviation of the wire core is obtained. By heating the plastic at certain relatively low temperatures the central region about the wire core remains firm during the molding, so that deviating stresses exemplified by the flowing plastic do not cause distortion of the wire core or shifting thereof from central position in the temple produced. The mold utilized in the foregoing operation is provided with a mold cavity and lateral flash chamber with an intervening very narrow or feather edge land. In the mold cavity is a recess for closely fitting the hinge ear. At the land are a series of spaced fingers external of the mold cavity but very close thereto and tapering toward the land, constituting a centering means for the tubular blank as it is being deformed, and past which the excess plastic or "flash" can flow as the tubular blank is transformed into a finished temple. Certain features of the above described invention are applicable not only to initially molded tubes but also to sections cemented together to form tubes.

Referring in detail to the drawing, 15 denotes a circularly continuous or closed tubular blank of Celluloid or similar material, which in diameter is considerably larger than the narrow part of a shaped temple. This tube may be produced by molding or extrusion in considerable lengths and then cut to produce a blank such as 15. It has a bore 15a of uniform diameter for receiving a wire core.

Laterally formed at an end of the tubular blank, according to the next step of the process, is an elongated cut out or opening 16 which extends to the extreme end of the blank and communicates with the bore 17 thereof. The opening 16 is of rectangular form in cross section and affords a seat 18 which is at the axis of the bore 17.

Next a wire core 19, or a wire core and a hinge ear 20 are provided. If the latter, the wire core is flattened down at 21 and riveted or otherwise secured to the shank 22 of the hinge ear.

Now the wire core 19 is inserted into the tubular blank 23, being easily and accurately guided thereinto by its bore 18, with the hinge ear 20 being received in the opening 16, its shank 22 resting on the seat 18. Thus the assembly 24 is produced.

Now the assembly 24 is subjected to heat and pressure, the tubular member 23 being deformed to produce the device 25. The tubular member 23 centrally retains the wire core as the molding begins and while it progresses, being aided in the latter instance by restraining or causing constriction of the tubular member at spaced points 26 between which the excess or flash 27 of plastic material is free to flow out, forming the extremely narrow connecting web 28 which is produced by the molding. It is noted that the points 26 begin directly at the outer edge of the web 28. The pinching effect referred to may be produced by interposing fixed resistances to the flow, of tapered form to permit exit of the flash without too much obstruction but to continue the resistance beyond the web. In this manner the stresses on the plastic are controlled and distributed so as not to cause deviation of the temple and particularly of the wire core, which should be accurately centered in the finished temple.

It is noted that the temple is relatively narrow along the region intermediate of its end portions, which are considerably wider, and the flash is therefore much greater at the central region. Hence the restraint as at 26 is most important at the latter. However, flash will also occur at the extreme ends as at 29 and 30, and such flash may be centered or restrained at 31 and 32, respectively. Thus a wire core sheath 35 is produced bounded by the web 28. As already indicated, the resistances at 26 constitute centering or positioning means for the tubular blank 23 relative to the smaller mold cavity, and those at 31, 32 may have a similar function. The restraint referred to may be substantial if the plastic is not too fluid.

Since the tubular blank 23 is externally circular, it can uniformly engage the resistances at 26 and 31, and also uniformly initially seats on the mouth of the die cavity at one section of the mold. The operation will be further explained hereinafter in describing the mold.

If desired the wire core and hinge ear unit may be preheated to facilitate the molding. The usual molding temperature is at least 200 degrees F. The heated mold closes relatively slowly and is then chilled to solidify the plastic.

I have discovered that if the shaping or molding temperature be reduced to about 150 degrees F., preferably without preheating the wire core and hinge, the internal region of the tubular Celluloid blank remains firm and assists in retaining the wire core centrally located and resists the strains and stresses produced in molding, but with the plastic tightly engaging around the wire core. Satisfactory use of this principle involves not exceeding a temperature of 170 degrees F. Nor should the temperature be less than 140 degrees F. because then the resistance to molding unduly increases, the plastic tending to tear instead of to flow. This principle may be utilized with or without a centering means exemplified at 26, but the best results are obtained by combining these features. The temperatures mentioned may vary slightly for other Celluloid like materials and hence may be regarded as approximate.

When the molding has been completed, the hinge ear 20 is preferably clear of plastic except at its shank 22 which has become embedded in the plastic, according to the mold hereinafter described in which a recess is provided for snugly receiving the projecting part of the hinge ear. If desired, the end 33 of the temple may be molded with usual transverse grooves or other rough surface to frictionally engage the side of the wearer's head.

The chilled device 25 is removed and the flash 27, 29 and 30 broken off, after which the temple may be beveled off at 34 and ground or polished smooth to provide the finished temple 36 having a plastic sheath 37 of varying thickness tightly engaging around the wire core and encasing the shank of the hinge ear 20.

If the hinge ear be not initially connected to the wire core, a recess may be molded somewhat similar to the opening 16, and the hinge ear inserted and riveted to the wire core in accordance with well known practice. The apparatus by which the above described process may be practiced with facility will now be described.

The mold 37 comprises lower and upper horizontal mold sections 38, 39, with the vertical movement of the upper section guided by standards 40 affixed to the lower section. Formed in the mold is a cavity one half of which lies in the lower section at 41 and the other half in the upper section 42. This mold cavity opens on the horizontal plane or parting line 43 at which is provided the substantially feather edge land 44 that surrounds the mold cavity. Surrounding the land is a chamber 45 for receiving the excess or flash of the molded material which is squeezed out at the land. Beyond the flash chambers the mold members 38, 39 have large seating faces in the plane of the land to assume the high pressure of the mold in its closed position and to thus prevent breakage of the extremely thin land portions. Formed in the mold members are conduits 46 for heating and cooling fluids whereby the plastic is first heated and then chilled. As thus far described the mold is conventional.

The shape of the mold cavity is long and narrow but somewhat wider at the end portions to conform in size and shape to the finished temple 36. In one portion of the cavity 41 is formed a bottom recess 47 for snugly receiving the projecting part of the hinge ear 20 when the assembly 24 is applied to the mold. A knockout pin 48 may be provided.

Intermediate of its end portions, the mold cavity is relatively narrow and circular. Along this narrow region are provided centering means 49, comprising a comb-like member at each side of the mold cavity. To receive the comb-like member, the mold members 38, 39 are formed with channels as at 50, 51, and the members 49 are bolted to the lower mold member at 52. In so countersinking the members 49, the outer bar portions 53 thereof may lie at the outer edges of the flash chambers 45, and the teeth 54 thereof may extend across and intersect these chambers, with at least a partial countersinking into the mold members as shown in Fig. 16. These teeth project and are tapered toward the mold cavity, but terminate at the outer edge of the land 44, though preferably a slight spacing may be provided as shown at 54a in the enlarged view of Fig. 18. Hence the space between the teeth on opposite sides of the mold cavity is only very slightly greater than the width of the mold cavity, and therefore is considerably less than the outside diameter of the assembly 24. The spacing of the teeth longitudinally of the mold cavity may depend upon how much lateral support is required in shaping the temple, while the mold is still open. Preferably the extreme ends 55 of the teeth 54 are flat or only slightly curved to afford ample resistance to the plastic in the shaping of the assembly 24, in course of molding. The teeth may have any suitable height which may permit the unit 23 to initially rest thereon while the hinge ear projects into the recess 47.

At the hinge ear end, a member 56 may be mounted in the manner of the members 49 and being like the latter except that it may have only one tooth 57 crossing the flash chamber and serving to engage the adjacent extreme end of the tubular blank 24. At this end, the mold cavity is generally rectangular, and the flash is much less, but considerable end flash may occur especially if the tubular blank is longer than the mold cavity. The tooth 57 may serve as a gage for positioning the tubular blank and for resisting outflow of plastic to assure complete embedment of the shank 22 of the hinge ear 20.

At the other end of the mold cavity, a pair of members 58 may be provided mounted in the manner of the members 49 and having alined teeth 59 projecting into the flash chamber 45 and serving to center the plastic tube 23 which may extend at this end beyond the mold cavity. The distance between the ends of the teeth 59 may be about equal to the maximum width of the adjacent part of the mold cavity. All the various teeth 54, 57 and 59 are identical in construction and operation except as otherwise described, and it may be noted that the teeth 57 and 59 do not extend up to the land 44, and the tooth 57 may be slightly higher to serve as an end gage for the tubular blank 23.

The operation of the mold 37 will now be described and the process thus further clarified. The mold is opened by raising the upper member 39 sufficiently to permit insertion of the plastic blank, hinge ear and wire core unit 24. When the upper mold member 39 is thus raised, it is clear of the various teeth 54, 57 and 59, being engaged with the lower mold member only by the guide elements 40. Upon insertion of the unit 24, the same rests upon the points of the teeth 54, as shown in dot-dash lines in Fig. 18, and since the unit 24 is round, uniform contact is readily obtained with the unit in a central relation to the mold cavity 41. In fact the unit 24 may also contact the land or edges of the mold cavity 41 while thus positioned. In so positioning the unit 24, the end thereof may be placed against the end of the tooth 57, which is higher than the teeth 54 and serves as a gage. At the same time, the hinge ear 20 is at least partially received in the recess 47 which also serves as a gage to assure that the hinge ear shall be in the proper position in the molded temple. This initial positioning of the hinge ear is indicated in dot-dash lines in Fig. 18. The different gaging arrangements may also cooperate with each other to assure that the hinge ear shall lie snugly against the closed end of the opening 16 in the tubular blank, and hence that the wire core lie in proper relation to the free end of the finished temple.

It requires only an instant to position the assembly unit 24 as above described, and while it rests on the teeth 54 and 59, a heating fluid enters the conduits 46 to quickly heat at least one of the die members, and then the upper member 39 is lowered under pressure. Now the tubular plastic blank 23 is softened and is gradually distorted as shown in Fig. 18; it comes into strong contact with the edges or land 44 of the lower mold member 38, while the land of the upper mold member bites into the plastic and squeezes it laterally. Meantime the teeth 54 and 59 centrally retain the unit 24 as it is caught by the upper mold member and avoid side slipping. As the deformation continues, the teeth 54 and 59 resist any tendency to unequal lateral flow of the plastic, and bite more and more deeply into the excess or flash of the plastic, their blunt ends affording substantial resistance which is enhanced by the tapered sides of the teeth, and the latter nevertheless providing ample space for the flow of plastic therebetween and into the flash chambers 45. The action referred to may also be described as causing restraining balanced resistances at opposite sides of the mold cavity at certain points between which the excess plastic freely flows. Thus not only does the plastic uniformly fill the mold cavity, but accurate centering of the wire core 19 is assured, since flow causing stresses in the plastic are laterally balanced. Further an accurate central position of the free end portion of the temple is obtained because of the teeth 59. As the plastic fills the mold cavity, the hinge ear enters further into the recess 47 while the gage element 57 now functions to assure that the plastic shall properly fill in around and embed the shank 22 of the hinge ear.

When the mold members 38, 39 are closed, they contact each other at the land 44 except for an intervening film of plastic which may be only a few one thousandths of an inch thick, forming a web that may be only about one sixty fourth of an inch wide. When thus closed, the powerful mold pressure is assumed by other flat faces of the mold which directly contact each other. The molding being completed, a cooling fluid is passed through the conduits 46 to chill the mold, and then the mold is opened and an article as in Fig. 8 extracted. Then the flash portions are broken off at the web and the article furnished to produce the temple 36, as previously described.

To the best of my knowledge, flash molding was never used heretofore for molding temples. Other kinds of molds were of the positive type so that the volume of the blank had to be carefully predetermined and had to be maintained accurate. Such molds did not permit any flash to occur, because the mold members engaged each other in a leak proof manner, one extending into the other. Therefore, it was necessary for a large quantity of plastic to flow from the narrow to the large portions of the die cavity. For a wire core temple, this difficulty was aggravated by the space occupied by the wire core at the narrow part of the cavity, and deviation of the wire core occurred. Higher temperatures and pressures could be applied but increased some of the difficulties and created other problems.

While my improvements are particularly adapted for molding Celluloid articles, they are also applicable to the molding of other plastics. The temperatures herein mentioned are intended only for Celluloid-like materials.

I claim:

1. The method of molding flexible, elongated articles in which a narrow plastic sheath uniformly centrally encases a wire core, with the width of the sheath varying along the length thereof, including providing a unit including a plastic tubular blank of uniform width containing the wire core, and softening and flash molding the plastic to produce said article by separating substantial portions of excess plastic from the blank, and resisting the flow of excess plastic by resistances at spaced, opposed points on opposite sides of the blank and beyond the edges of the article but closely adjacent thereto while permitting free flow of plastic between said points with the resistance being sufficient to afford a balanced plastic pressure condition therebetween to avoid deviation from center of adjacent portions of the wire core by the plastic that is being molded to produce said article.

2. The method of molding flexible, elongated articles in which a narrow plastic sheath, uniformly centrally encases a wire core, the width of the sheath varying along the length of the wire core, including providing a unit comprising a plastic tubular sheath of uniform width containing the wire core, softening and molding the plastic tube of the unit in a flash mold having a land along its parting line and as the molding operation begins and continues, providing resistance at a plurality of opposed points disposed along a relatively narrow portion of the mold cavity to act externally thereof beginning at the land of the mold to prevent outward flow of excess plastic at the points but to permit such outward flow alongside of and between the points to thus produce a pressure condition in the adjacent parts of the mold cavity tending to prevent deviation from center of the wire core by strains produced in expressing the excess plastic from the mold cavity.

3. The process according to claim 2 wherein the land affords a substantially feather edge whereby said opposed points closely approach the molded temple.

4. The process of making a flexible wire core temple of varying cross section and having a laterally projecting metallic hinge ear directly connected to the wire core, including providing a unit comprising a blank in the form of a tube of relatively uniform cross section having a lateral end opening for accommodating the hinge ear, with the wire core disposed in the tube, providing a flash mold having a mold cavity for the temple having a narrow land, with the mold cavity being substantially smaller at certain points thereof than the cross section of the tube, and having a recess to snugly receive the hinge ear, placing the unit in the mold with the tube and hinge ear initially only partly received respectively in said cavity and said recess, applying heat and molding pressure to the tube to soften the same and to cause part of its plastic material to fill the cavity while the hinge ear moves fully into the recess, and causing the excess of plastic to move laterally against spaced, opposed resistances and flowing therebetween whereby the resistances center the tube while the mold is closing to produce a temple having a relatively accurately centered wire core, free of molding deformations and the said excess of plastic being substantially separated from the temple at the land.

5. Apparatus for producing a wire core temple or the like by molding a plastic tube of uniform diameter containing a flexible central wire core, including a flash mold having a parting line defining mold members provided with a mold cavity varying in size along the length thereof and to provide a relatively small cavity portion and having a narrow surrounding land and a relatively open space therebeyond for receiving the excess of plastic expressed from the relatively small portion of the cavity, and means for preventing such expression of excess plastic from causing deviation of the wire core from central position, including a plurality of pairs of opposed fingers spaced along the small portion of the cavity externally of the land but closely adjacent thereto and leaving free spaces between said pairs of fingers for flow of the excess plastic, the fingers lying directly in the path of the excess plastic as it leaves the cavity to thus produce a balanced pressure condition in the narrow portion of the cavity so that deviations of the wire core by stresses in the plastic caused by molding the same are prevented.

6. Apparatus according to claim 5 wherein said mold is provided in said open space with an overflow cavity for the excess plastic and a seating surface between the mold members beyond the overflow cavity, said fingers being located in said overflow cavity.

7. Apparatus according to claim 5 wherein one mold member is provided with a recess at the mold cavity for snugly receiving a wire core hinge ear to thus position the same.

8. Apparatus according to claim 5 wherein one mold member has a recess in the cavity wall for snugly receiving a wire core hinge ear, and an additional finger beyond the land positioned to abut an open end of the tube adjacent to the recess, for locating the tube relative to the hinge ear.

9. Apparatus according to claim 5 wherein the land affords substantially a feather edge, said fingers being positioned very closely to the mold cavity at said feather edge.

MICHAEL ALBANESE.

REFERENCES CITED

The following references are of record in the file of this patent:

UNITED STATES PATENTS

| Number | Name | Date |
|---|---|---|
| 1,733,739 | Laukamp | Oct. 29, 1929 |
| 2,120,502 | Morton | June 14, 1938 |
| 1,459,778 | Leytham | June 26, 1923 |
| 1,568,629 | Schumacher et al. | Jan. 5, 1926 |
| 1,638,002 | Lynn | Aug. 2, 1927 |
| 1,649,791 | Welsh | Nov. 15, 1927 |
| 2,197,465 | Brunetti | Apr. 16, 1940 |
| 721,462 | Richards | Feb. 24, 1903 |
| 808,949 | Roos | Jan. 2, 1906 |
| 2,256,769 | Amrine | Sept. 23, 1941 |
| 2,324,978 | Lohrand et al. | July 20, 1943 |
| 1,816,011 | Gurnee | July 28, 1931 |
| 2,148,079 | Martin, Jr. | Feb. 21, 1939 |
| 2,173,186 | Swartz et al. | Sept. 19, 1939 |
| 2,335,294 | Meyer | Nov. 30, 1943 |
| 1,825,427 | Siddall | Sept. 29, 1931 |